United States Patent
Zhang

(10) Patent No.: US 12,147,887 B2
(45) Date of Patent: Nov. 19, 2024

(54) METHOD FOR TRAINING JOINT MODEL, OBJECT INFORMATION PROCESSING METHOD, APPARATUS, AND SYSTEM

(71) Applicant: BOE Technology Group Co., Ltd., Beijing (CN)

(72) Inventor: Zhenzhong Zhang, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 754 days.

(21) Appl. No.: 17/311,583

(22) PCT Filed: Sep. 11, 2020

(86) PCT No.: PCT/CN2020/114674
§ 371 (c)(1),
(2) Date: Jun. 7, 2021

(87) PCT Pub. No.: WO2022/052021
PCT Pub. Date: Mar. 17, 2022

(65) Prior Publication Data
US 2022/0327361 A1  Oct. 13, 2022

(51) Int. Cl.
*G06N 3/045*  (2023.01)
*G06V 10/82*  (2022.01)
*G06V 20/68*  (2022.01)

(52) U.S. Cl.
CPC .......... *G06N 3/045* (2023.01); *G06V 10/82* (2022.01); *G06V 20/68* (2022.01)

(58) Field of Classification Search
CPC ......... G06N 3/045; G06V 20/68; G06V 10/82
See application file for complete search history.

(56) References Cited

U.S. PATENT DOCUMENTS

2019/0220969 A1* 7/2019 Miki ............... G06N 20/00
2019/0340674 A1  11/2019 Vaananen

FOREIGN PATENT DOCUMENTS

| CN | 106203493 A | | 12/2016 | |
| CN | 106529402 | * | 3/2017 | ........ G06V 40/172 |
| CN | 106529402 A | | 3/2017 | |
| CN | 106529564 A | | 3/2017 | |
| CN | 108597582 | * | 9/2018 | ............. G06N 3/08 |
| CN | 108597582 A | | 9/2018 | |
| CN | 109993623 A | | 7/2019 | |
| CN | 111222546 A | | 6/2020 | |
| CN | 111222569 A | | 6/2020 | |

* cited by examiner

*Primary Examiner* — Myron Wyche
(74) *Attorney, Agent, or Firm* — Banner & Witcoff, Ltd.

(57) ABSTRACT

An object information processing method includes: acquiring an image of an object to be detected; inputting the image into a joint model to obtain a plurality of labels of the object to be detected; and obtaining object information of the object to be detected based on the plurality of labels. The joint model includes a convolutional neural network, the convolutional neural network includes a plurality of sub-networks. The plurality of sub-networks include an underlying processing network output of the underlying processing network and perform operation processing on the output of the underlying processing network to output a label, and labels output by different output networks are different.

16 Claims, 8 Drawing Sheets

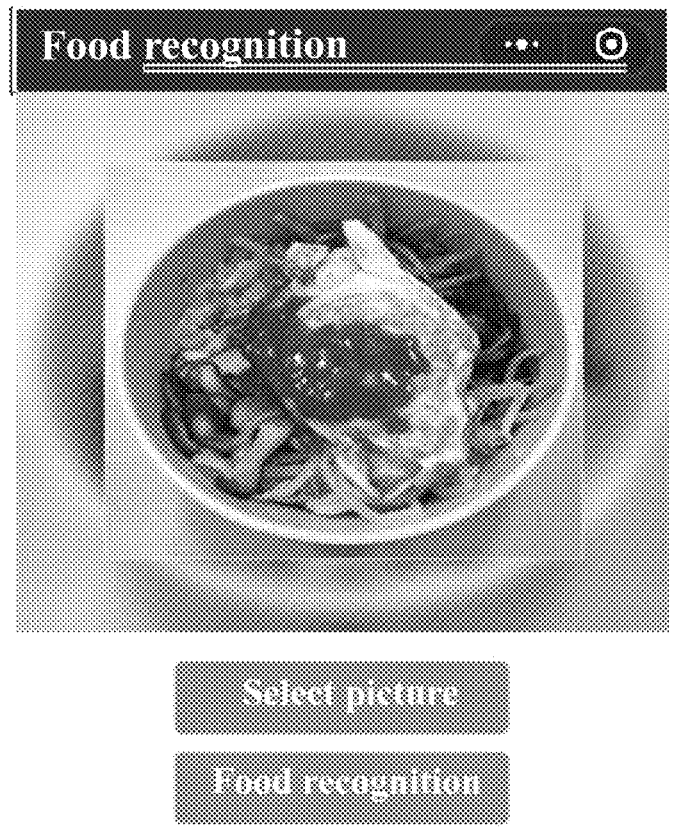
Recognition results:
Hotpot Mixed Rice
Similarity: 89%
Calories: 173
Nutritional
ingredients: carbohydrate
fat
protein
cellulose
FIG.4B

50

S501 — Input sample data into the joint model to obtain output data output from the joint model, in which the sample data includes a sample image and at least two preset labels corresponding to the object to be detected in the sample image, and the output data includes probability vectors corresponding to the preset labels respectively S502 — Calculate a loss function based on the at least two preset labels and the probability vectors S503 — Modify parameters of the joint model based on the loss function

Image acquiring unit
601

Prediction unit
602

Processing sub-unit
613
603

FIG.6

METHOD FOR TRAINING JOINT MODEL, OBJECT INFORMATION PROCESSING METHOD, APPARATUS, AND SYSTEM

The application is a U.S. National Phase Entry of International Application No. PCT/CN2020/114674 filed on Sep. 11, 2020, designating the United States of America. The present application claims priority to and the benefit of the above-identified applications and the above-identified applications are incorporated by reference herein in their entirety.

TECHNICAL FIELD

Embodiments of the present disclosure relate to a method for training a joint model, an object information processing method, an object information processing apparatus, an object information processing system, an electronic device, and a non-transitory readable storage medium.

BACKGROUND

Deep learning is a specific type of machine learning algorithm activated in the manner that a brain works. This method attempts to model in the manner that the human brain processes light and sound into vision and auditory. For example, deep learning applications are computer vision and speech recognition. In deep learning models, neurons are interconnected to trigger an answer based on input. Deep learning aims to define a neural network organized in multiple layers, so that input data is processed layer by layer, thereby, in the case where the weights between links are correctly selected, the final layer can provide a high-level abstraction of the input data. One of the representative algorithms of deep learning is convolutional neural network.

SUMMARY

At least one embodiment of the present disclosure provides an object information processing method, which includes: acquiring an image of an object to be detected; inputting the image into a joint model to obtain a plurality of labels of the object to be detected; and obtaining object information of the object to be detected based on the plurality of labels. The joint model includes a convolutional neural network, the convolutional neural network includes a plurality of sub-networks, and the plurality of sub-networks include an underlying processing network and at least two output networks. The underlying processing network includes a plurality of operation layers, and is used to perform operation processing on the image. An output of the underlying processing network serves as an input of each of the at least two output networks. The each of the at least two output networks includes a plurality of operation layers and is used to receive the output of the underlying processing network and perform operation processing on the output of the underlying processing network to output a label. Labels output by different output networks are different.

For example, in the object information processing method provided by at least one embodiment of the present disclosure, the plurality of labels include a category label and a size label.

For example, in the object information processing method provided by at least one embodiment of the present disclosure, the object to be detected includes food, and the object information of the object to be detected includes: at least one of the name, calorie, and nutrient ingredients of the object to be detected.

For example, in the object information processing method provided by at least one embodiment of the present disclosure, obtaining the object information of the object to be detected based on the plurality of labels includes: acquiring data in an object database based on the plurality of labels so as to obtain the object information of the object to be detected.

For example, in the object information processing method provided by at least one embodiment of the present disclosure, acquiring the data in the object database based on the plurality of labels to obtain the object information of the object to be detected includes: acquiring, based on the plurality of labels, data of the object to be detected from the object database with a similarity matching method, in which the object to be detected includes food, the plurality of labels include a category label and a size label, and the data of the object to be detected at least includes the name and unit calorie of the object to be detected; and calculating a calorie of the object to be detected base on the size label and the unit calorie of the object to be detected, so as to obtain the object information of the object to be detected, in which the object information of the object to be detected at least includes the name and the calorie of the object to be detected.

For example, in the object information processing method provided by at least one embodiment of the present disclosure, different output networks include different number of operation layers.

For example, in the object information processing method provided by at least one embodiment of the present disclosure, the at least two output networks include a first output network and a second output network, and a number of operation layers included in the first output network is greater than a number of operation layers included in the second output network, and the size of a convolution kernel of a convolutional layer in each operation layer in the first output network is smaller than the size of a convolution kernel of a convolutional layer in each operation layer in the second output network.

For example, in the object information processing method provided by at least one embodiment of the present disclosure, the size of a convolution kernel of a convolutional layer in each operation layer in the underlying processing network is 5×5, the size of a filter of a pooling layer in each operation layer in the underlying processing network is 2×2, and an activation function in each operation layer in the underlying processing network is a rectified linear unit. The at least two output networks include a first output network and a second output network, the size of a convolution kernel of a convolutional layer in each operation layer in the first output network is 3×3, the size of a filter of a pooling layer in each operation layer in the first output network is 2×2, and an activation function in each operation layer in the first output network is a rectified linear unit. The size of a convolution kernel of a convolutional layer in each operation layer in the second output network is 4×4, the size of a filter of a pooling layer in each operation layer in the second output network is 2×2, and an activation function in each operation layer in the second output network is a rectified linear unit.

For example, the object information processing method provided by at least one embodiment of the present disclosure further includes: outputting the object information of the object to be detected.

At least one embodiment of the present disclosure provides a method for training a joint model. The joint model includes a convolutional neural network, the convolutional neural network includes a plurality of sub-networks, and the plurality of sub-networks include an underlying processing network and at least two output networks. The underlying processing network includes a plurality of operation layers and is used to perform operation processing on an image of an object to be detected, and an output of the underlying processing network serves as an input of each of the at least two output networks. Each of the at least two output networks includes a plurality of operation layers, and each of the at least two output networks is used to receive the output of the underlying processing network and perform operation processing on the output of the underlying processing network to output a label of the object to be detected, and labels output by different output networks are different. The method for training the joint model includes: inputting sample data into the joint model to obtain output data output by the joint model, where the sample data includes a sample image and at least two preset labels corresponding to the object to be detected in the sample image, and the output data includes probability vectors corresponding to the at least two preset labels respectively; calculating a loss function based on the at least two preset labels and the probability vector; and modifying a parameter of the joint model based on the loss function.

For example, in the method for training a joint model provided by at least one embodiment of the present disclosure, the loss function L is:

$$L = -\gamma \times \sum_{i=1}^{N} y_i \log l_i - (1-\gamma) \times \sum_{i=1}^{N} y'_i \log l'_i,$$

where $\gamma$ represents an adjustment parameter, N represents a number of sample images, $y_i$ represents a first preset label of an object to be detected in an $i^{th}$ sample image, and $l_i$ represents a probability corresponding to the first preset label $y_i$ in a probability vector output by the joint model for the object to be detected in the $i^{th}$ sample image, $y'_i$ represents a second preset label of the object to be detected in the $i^{th}$ sample image, and $l'_i$ represents a probability corresponding to the second preset label $y'_i$ in a probability vector output by the joint model for the object to be detected in the $i^{th}$ sample image.

For example, in the method for training a joint model provided by at least one embodiment of the present disclosure, the labels of the object to be detected include a category label and a size label.

For example, in the method for training a joint model provided by at least one embodiment of the present disclosure, the at least two preset labels comprise a preset category label and a preset size label, the first preset label is the preset category label, and the second preset label is the preset size label.

For example, in the method for training a joint model provided by at least one embodiment of the present disclosure, the object to be detected includes food, and the sample image includes a food image.

At least one embodiment of the present disclosure provides an object information processing apparatus, which includes: an image acquiring unit, configured to acquire an image of an object to be detected; a prediction unit, configured to input the image into a joint model to obtain a plurality of labels of the object to be detected; and a processing unit, configured to obtain object information of the object to be detected based on the plurality of labels. The joint model includes a convolutional neural network, the convolutional neural network includes a plurality of sub-networks, and the plurality of sub-networks include an underlying processing network and at least two output networks. The underlying processing network includes a plurality of operation layers, the underlying processing network is used to perform operation processing on the image, and an output of the underlying processing network serves as an input of each of the at least two output networks. Each of the at least two output networks includes a plurality of operation layers and is used to receive the output of the underlying processing network and perform operation processing on the output of the underlying processing network to output a label. Labels output by different output networks are different.

For example, in the object information processing apparatus provided by at least one embodiment of the present disclosure, the processing unit further includes a processing sub-unit, and the processing sub-unit is configured to: acquire data in an object database based on the plurality of labels to obtain the object information of the object to be detected.

For example, in the object information processing apparatus provided by at least one embodiment of the present disclosure, the plurality of labels comprise a category label and a size label.

At least one embodiment of the present disclosure provides an object information processing system, which includes a terminal and an object information processing server. The terminal is configured to transmit requested data and an image of an object to be detected to the object information processing server. The object information processing server is configured to: acquire the image of the object to be detected in response to the request data; input the image into a joint model to obtain a plurality of labels of the object to be detected; obtain object information of the object to be detected based on the plurality of labels; and transmit the object information to the terminal. The terminal is further configured to display the object information. The joint model includes a convolutional neural network, the convolutional neural network includes a plurality of sub-networks, and the plurality of sub-networks include an underlying processing network and at least two output networks. The underlying processing network includes a plurality of operation layers, and the underlying processing network is used to perform operation processing on the image, and an output of the underlying processing network serves as an input of each of the at least two output networks. Each of the at least two output networks includes a plurality of operation layers and is used to receive the output of the underlying processing network and perform operation processing on the output of the underlying processing network to output a label. Labels output by different output networks are different.

At least one embodiment of the present disclosure provides an electronic device, which includes: a processor; and a memory. The memory includes one or more computer program modules. The one or more computer program modules are stored in the memory and are configured to be executed by the processor. The one or more computer program modules include instructions for implementing the object information processing method according to any one of embodiments described above.

At least one embodiment of the present disclosure provides a non-transitory readable storage medium with computer instructions stored thereon. The computer instructions, upon executed by a processor, implement the object information processing method according to any one of embodiments described above.

BRIEF DESCRIPTION OF THE DRAWINGS

In order to explain the technical schemes of the embodiments of the present disclosure more clearly, the drawings of the embodiments will be briefly described in the following. It is obvious that the drawings described below only relate to some embodiments of the present disclosure, rather than limit the present disclosure.

FIG. 4B is the second exemplary interface diagram of an application of an object information processing method provided by at least one embodiment of the present disclosure;

FIG. 5 is a flowchart of a method for training a joint model provided by at least one embodiment of the present disclosure;

FIG. 6 is a schematic block diagram of an object information processing apparatus provided by at least one embodiment of the present disclosure;

DETAILED DESCRIPTION

Figure 1:
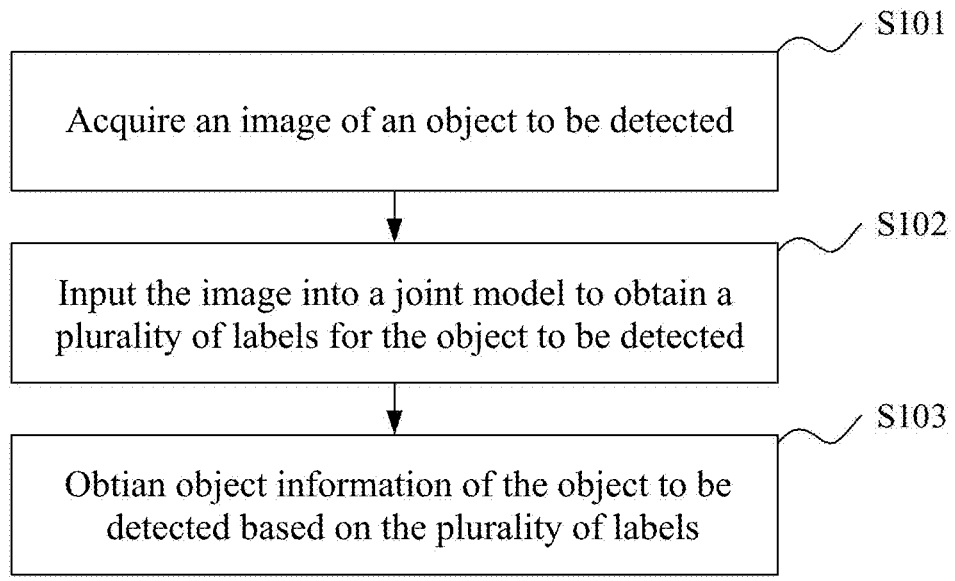
FIG. 1 is a flowchart of an object information processing method provided by at least one embodiment of the present disclosure.

In order to make the objects, technical schemes and advantages of the embodiments of the present disclosure more clear, the technical solutions of the embodiments of the present disclosure will be described clearly and comprehensively in connection with the drawings. Obviously, the described embodiments are only parts of the present disclosure, rather than all of the embodiments thereof. All the other embodiments obtained by those of ordinary skill in the art based on the embodiments of the present disclosure without paying creative efforts fall into the protection scope of the present disclosure.

Unless otherwise defined, all the technical and scientific terms used herein have the same meanings as commonly understood by those of ordinary skill in the art to which the present disclosure belongs. The terms "first", "second" etc., which are used in the present disclosure, are not intended to indicate any sequence, quantity or importance, but used to distinguish various components. Similarly, the terms, such as "a/an", "the", "one" etc., are not intended to indicate the limitation on amounts, but used to denote the presence of at least one. The terms, such as "comprise/comprising", "include/including" etc., are intended to specify that the elements or the objects stated before these terms encompass the elements or the objects and equivalents thereof listed after these terms, but not preclude other elements or objects. The terms, such as "connect/connecting/connected", "couple/coupling/coupled" etc., are not limited to a physical connection or mechanical connection, but may include an electrical connection/coupling, directly or indirectly. The terms, "on", "under", "left", "right" etc., are only used to indicate relative position relationship, and when the position of the object which is described is changed, the relative position relationship may be changed accordingly.

With the rapid development of the health industry, people pay more and more attention to body shape and health, especially the calorie and nutritional ingredients contained in the diet. The inventors of the present disclosure noticed that there are many products for querying food calorie and nutritional ingredients on the market, but these products generally calculate the calorie of food and query nutritional ingredients based on the name of food and the corresponding amounts text which are input by users. When a user does not know the name of food or only knows the alias but does not know the formal name, these products cannot work effectively (for example, the user may enter "volcano snowing" and cannot get the calorie and nutritional ingredients of "Tomato Slices with Sugar" which is a kind of Chinese food, where, "volcano snowing" is one of the aliases of the "Tomato Slices with Sugar"). At present, there are also some products having the function of food recognition, that is, after inputting a food image into the products, the name of food is output, but these products can only provide the unit calorie of the food, cannot calculate the total calorie, and cannot provide nutritional ingredients of the food.

At least one embodiment of the present disclosure provides an object information processing method, a method for training a joint model, an object information processing apparatus, an object information processing system, an electronic device, and a non-transitory readable storage medium. The object information processing method includes: acquiring an image of an object to be detected; inputting the image into a joint model to obtain a plurality of labels of the object to be detected; and obtaining object information of the object to be detected based on the plurality of labels. The joint model includes a convolutional neural network, the convolutional neural network includes a plurality of sub-networks, and the plurality of sub-networks include an underlying processing network and at least two output networks. The underlying processing network includes a plurality of operation layers and is used to perform operation processing on the image, and an output of the underlying processing network serves as an input of each of the at least two output networks. The each of the at least two output networks includes a plurality of operation layers and is used to receive the output of the underlying processing network and perform operation processing on the output of the underlying processing network to output a label. Labels output by different output networks are different.

In the object information processing method provided by at least one embodiment of the present disclosure, the object information of the object to be detected is obtained, using the joint model, based on the image of the object to be detected. Based on the same image, the joint model can output multiple different labels of the object to be detected. This joint model can reduce the complexity by using the constraint relationships between different labels, and improve the accuracy of the output results. In the joint model, at least two output networks share the output from the same underlying processing network, thus reducing the demand for training data and therefore, the training efficiency is improved. It can also simplify the network structure while ensuring the output of multiple different labels.

The object information processing method according to at least one embodiment of the present disclosure is explained in a non-limiting way by several examples or embodiments. As described below, different features in these specific examples or embodiments can be combined with each other without conflicting, so as to obtain new examples or embodiments, which also belong to the scope of protection of the present disclosure.

Figure 2:
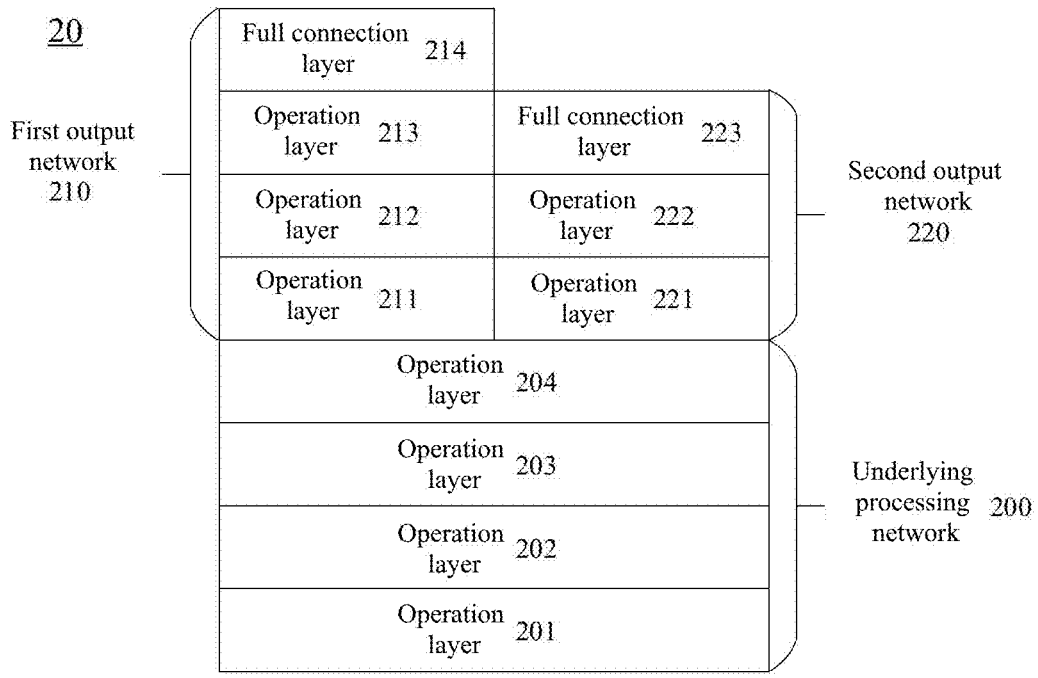
FIG. 2 is a schematic diagram of a joint model provided by at least one embodiment of the present disclosure.

FIG. 1 is a flowchart of an object information processing method provided by at least one embodiment of the present disclosure, and FIG. 2 is a schematic diagram of a joint model provided by at least one embodiment of the present disclosure. An object information processing method 10 provided by at least one embodiment of the present disclosure can be applied to scenarios such as food image recognition, for example, can be applied to an automatic query system for food calorie and nutritional ingredients, and other similar systems. Herein, the "food calorie" refers to the total calories and/or unit calorie of food.

For example, in at least one embodiment, as illustrated in FIG. 1, the object information processing method 10 may include the following steps:

In step S101: an image of an object to be detected is acquired.

In step S102: the image is inputted into a joint model to obtain a plurality of labels of the object to be detected.

In step S103: object information of the object to be detected is obtained based on the plurality of labels.

For example, in the object information processing method 10, a joint model 20 is used, which is, for example, a convolutional neural network. As illustrated in FIG. 2, the convolutional neural network includes a plurality of sub-networks, the plurality of sub-networks include an underlying processing network 200 and at least two output networks (for example, a first output network 210 and a second output network 220 in FIG. 2). The underlying processing network 200 includes a plurality of operation layers (e.g., operation layers 201-204 in FIG. 2), the underlying processing network 200 is used to perform operation processing on images, and the output of the underlying processing network 200 serves as the input of each of at least two output networks (for example, the first output network 210 or the second output network 220 in FIG. 2). Each of the at least two output networks includes a plurality of operation layers (for example, the first output network 210 in FIG. 2 includes operation layers 211-213, and the second output network 220 in FIG. 2 includes operation layers 221 and 222), and the each of the at least two output networks is used to receive the output of the underlying processing network 200 and perform operation processing on the output of the underlying processing network to output the labels, and labels output by different output networks are different.

It should be noted that, in examples of the present disclosure, steps S101-S103 can be executed sequentially or in other adjusted orders, and some or all of the operations in steps S101-S103 can also be executed in parallel. The embodiments of the present disclosure do not limit the execution order of each step, but can be adjusted according to actual conditions. For example, in the examples of the present disclosure, steps S101-S103 may be performed in a separate server (e.g., a cloud server, etc.) or may be performed on a local terminal, which is not limited by the embodiments of the present disclosure. For example, in some examples, in implementing the object information processing method 10 provided by at least one embodiment of the present disclosure, parts of the steps S101-S103 may be performed selectively, or other additional steps except steps S101-S103 may also be performed, which are not specifically limited by the embodiments of the present disclosure.

For example, in at least one embodiment, as illustrated in FIG. 2, the convolutional neural network 20 includes the underlying processing network 200, the first output network 210, and the second output network 220. Each operation layer included in the convolutional neural network 20 (for example, each of the operation layers 201-204, 211-213, and 221-222 in FIG. 2) may include a convolution layer, a pooling layer, and an activation function. For example, the convolution layer can be used for feature extraction of input data (e.g., the image of the object to be detected), and the convolution layer includes a plurality of convolution kernels. Generally, the size of convolution kernel, the stride, and the filling jointly determine the size of the feature map output by the convolution layer. For example, the smaller the size of the convolution kernel, the more emphasis is placed on detail processing, which is conducive to capture small features in images. The activation functions is used to perform non-linear mapping on the output of the convolution layer for assisting in the express of complex features. For example, the commonly used activation functions include rectified linear unit (ReLU), Sigmoid, hyperbolic tangent (tan h) and so on. Generally, the ReLU is easier to converge, and the prediction performance is better with ReLU. Generally, the pooling layer is placed behind the convolution layer, which can be regarded as a kind of filter to realize the function of sampling. For example, after the feature extraction in the convolution layer, the feature map output by the convolution layer can be passed to the pooling layer for feature selection and information filtering. The pooling methods often used in the design of convolutional neural networks include mean pooling, maximum pooling, and others.

As illustrated in FIG. 2, the first output network 210 includes a full connection layer 214 in addition to the operation layers 211-213, and the second output network 220 includes a full connection layer 223 in addition to the operation layers 221 and 222. Generally, the convolution layer and the pooling layer can extract features from input data, and the function of the full connection layer is to non-linearly combine the extracted features to obtain the output. For example, classification labels can be output through a logic function or a normalized exponential function (Softmax function). For example, labels output by different output networks are different. For example, classification labels are the output results of the first output network 210 and the second output network 220, and the labels output by the first output network 210 and the second output network 220 are different. For example, the categories of the output labels are different. For example, in some examples, in the case where the object to be detected is food, the first output network 210 outputs a category label for the food (e.g., "watermelon", "mango", "sweet potato", etc.), and the second output network 220 outputs a size label for the food (e.g., "large", "medium", or "small"). Here, the food categories can be food types, such as fruits, staple foods, meat, vegetables, etc., and can also be refined to specific food, such as apples, rice, beef, cabbages, etc. In the implementation the method provided by the embodiments of the present disclosure, the meaning of the food categories can be determined according to actual requirements, and the embodiments of the present disclosure do not limit this.

For example, in at least one embodiment, different output networks may include different number of operation layers. For example, as illustrated in FIG. 2, the first output network 210 includes three operation layers, that is, operation layers 211, 212, and 213, and the second output network 220 includes two operation layers, that is, operation layers 221 and 222. The number of operation layers included in different output networks may be different, which makes different output networks have different feature extraction and processing capabilities, so that the feature extraction and processing capabilities of the respective output networks can meet their own processing requirements, and images can be processed in different degrees, thereby outputting different types of labels. In this way, the accuracy of processing results can be ensured, the resources can be saved, and the operations can be simplified. For example, in some examples, the object to be detected is food, and the first output network 210 outputs category labels for the food, while the second output network 220 outputs size labels for the food. Since the determination of food category is more complicated than the determination of food size, the number of operation layers in the first output network 210 is larger than that in the second output network 220, so that the feature extraction and processing capabilities of the respective output networks can meet their respective processing requirements.

It should be noted that, in the embodiments of the present disclosure, different output networks may also include the same number of operational layers, and the number of operational layers included in each output network may be set according to actual requirements, such as the complexity of tasks processed by the respective output networks, which is not limited by the embodiments of the present disclosure.

For example, in at least one embodiment, the number of operation layers included in the first output network 210 is larger than the number of operation layers included in the second output network 220, and the size of the convolution kernel of the convolution layer in each operation layer in the first output network 210 is smaller than the size of the convolution kernel of the convolution layer in each operation layer in the second output network 220. For example, for the output network corresponding to processing tasks with high complexity, the number of operation layers in the output network can be set to be relatively large, and the size of convolution kernel in the operation layers can be set to be relatively small, so as to capture small details in the image and improve the accuracy of the output results. Of course, there is no necessary correlation between the number of operation layers and the size of convolution kernel. When the number of operation layers of each output network is different, the size of convolution kernel of the convolution layers in the operation layers of each output network can be the same, or may have any size, which can be determined according to actual requirements, and the embodiments of the present disclosure are not limited to this.

For example, in at least one embodiment, the specific structure of the joint model 20 illustrated in FIG. 2 can be designed as follows. The size of the convolution kernel of the convolutional layer of each operation layer in the underlying processing network 200 is 5×5, the size of the filter of the pooling layer in each operation layer in the underlying processing network 200 is 2×2, and the activation function in each operation layer in the underlying processing network 200 is the rectified linear unit (ReLU). For example, the size of the convolution kernel of each operation layer in the first output network 210 is 3×3, the size of the filter of the pooling layer in each operation layer in the first output network 210 is 2×2, and the activation function in each operation layer in the first output network 210 is the rectified linear unit (ReLU). The size of the convolution kernel of each operation layer in the second output network 220 is 4×4, the size of the filter of the pooling layer in each operation layer in the second output network 220 is 2×2, and the activation function in each operation layer in the second output network 220 is the rectified linear unit (ReLU).

The example structure of the joint model 20 described above provided by the embodiments of the present disclosure, that is, the specific parameter setting can be applied to the following application scenarios: the processing task corresponding to the first output network 210 is determining category labels for the food, and the processing task corresponding to the second output network 220 is determining size labels for the food. The category labels include more than 200 types, and the size labels include 3 types (for example, "large", "medium" and "small"). The category and size of the food to be detected can be effectively obtained by setting the specific parameters of the above-mentioned joint model 20, and the information such as the name, calorie, and nutrient ingredients of the food to be detected can further be obtained. Therefore, the parameters of the joint model 20 can be adjusted by the information of processing tasks of different output networks (for example, the information of category labels and the information of size labels) in which the required training data can be reduced and the accuracy can be improved. Of course, the above-mentioned joint model 20 can also be applied to other application scenarios, which is not limited by the embodiments of the present disclosure.

In the example structure of the joint model 20 described above, the size of the convolution kernel of the convolution layer in the first output network 210 is 3×3, and the size of the convolution kernel of the convolution layer in the second output network 220 is 4×4. The first output network 210 handles category labels and needs to process complex features, thus the convolution kernel is smaller, while the second output network 220 handles size labels and needs to process relatively simple features, thus the convolution kernel of second output network 220 is larger. In this way, the accuracy of processing results can be ensured, the resources can be saved as much as possible, and the processing efficiency can be improved. The size of the convolution kernel and the size of the filter in the above examples can meet the processing requirements of common food pictures, and therefore, accurate results can be output without wasting computing resources.

It should be noted that the specific structure of the convolutional neural network 20 described in the above embodiments is only exemplary, and the embodiments of the present disclosure do not specifically limit the number of output networks, the number of operation layers of the output networks, the number of operation layers of the underlying processing networks, the size of convolution kernel in each operation layer, the size of filter, the specific type of activation function, etc., which can be set according to actual requirements. In addition to convolution layer, pooling layer, and activation function, the operation layer can further include other calculation layers to realize corresponding operation processing. Each operation layer is not limited to one convolution layer, one pooling layer, and one activation function, but can also include multiple convolution layers, multiple pooling layers, and multiple activation functions, which can be set according to actual requirements.

In the object information processing method 10 provided by at least one embodiment of the present disclosure, by adopting the joint model 20, the object information of the object to be detected can be obtained based on the image of the object to be detected. The joint model 20 can output a plurality of different labels of the object to be detected based on the same image. The joint model 20 can reduce the complexity by using the constraint relationships between different labels, and improve the accuracy of the output results. In the joint model 20, at least two output networks share the output from the same underlying processing network, thus the demand for training data is reduced and the training efficiency is further improved, in addition, the network structure is simplified while ensuring the output of multiple different labels.

For example, in at least one embodiment of the present disclosure, the plurality of labels may include category labels and size labels. For example, the object to be detected may be food, and the object information of the object to be detected may include at least one of the name, calorie, and nutritional ingredients of the object to be detected. For example, the category labels can be "watermelon", "mango", "sweet potato" etc., and the size labels can be "large", "medium" or "small". The size labels can also be a plurality of weight ranges, such as 0-100 g, 100-300 g, 300-500 g, etc. For example, the calorie can be the total calories and/or unit calorie for the food.

For example, in at least one embodiment of the present disclosure, the object information processing method 10 provided by the embodiments above is applied to a scenario of food image recognition, for example, applied to an automatic query system for food calorie and nutritional ingredients. Using the object information processing method 10, food information such as the name, calorie, and nutritional ingredients of the food to be detected in the food image can be obtained by querying.

Figure 3:
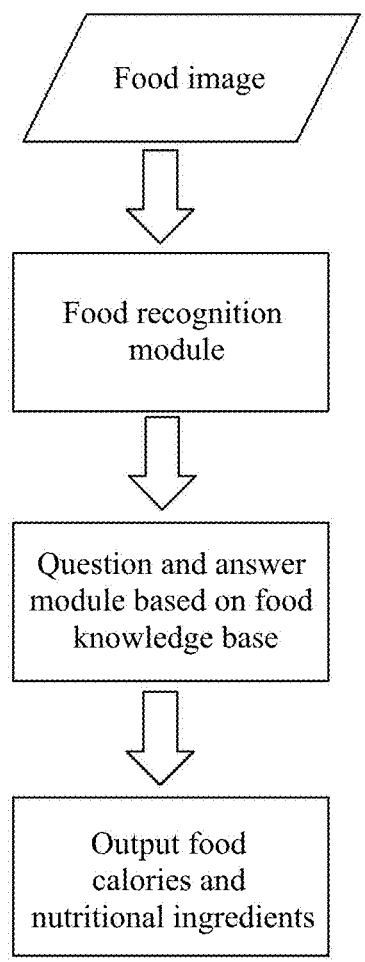
FIG. 3 is a schematic diagram of an automatic query system for food calorie and nutritional ingredients provided by at least one embodiment of the present disclosure.

Referring to FIG. 3, various operations when the object information processing method 10 is applied to an automatic query system for food calorie and nutritional ingredients are described in detail below.

In step S101, an image of an object to be detected is acquired.

As illustrated in FIG. 3, a food image is first acquired. For example, the image of the object to be detected can be an image input by the user, such as a photo taken by the user with a mobile phone or a camera, or a photo stored in a photo album of the user's mobile phone, a photo downloaded from the network, etc. The embodiments of the present disclosure do not specifically limit the source of the image.

It should be noted that the embodiments of the present disclosure do not impose strict restrictions on the factors such as image clarity, camera shooting angle, shooting distance, etc., as long as the image has certain clarity and can present food. For example, the object information processing method 10 provided by the embodiments of the present disclosure may further include a step of preprocessing the acquired image, such as de-noising, smoothing, cropping, etc., therefore, the preprocessed image is more suitable for subsequent processing.

Figure 4A:
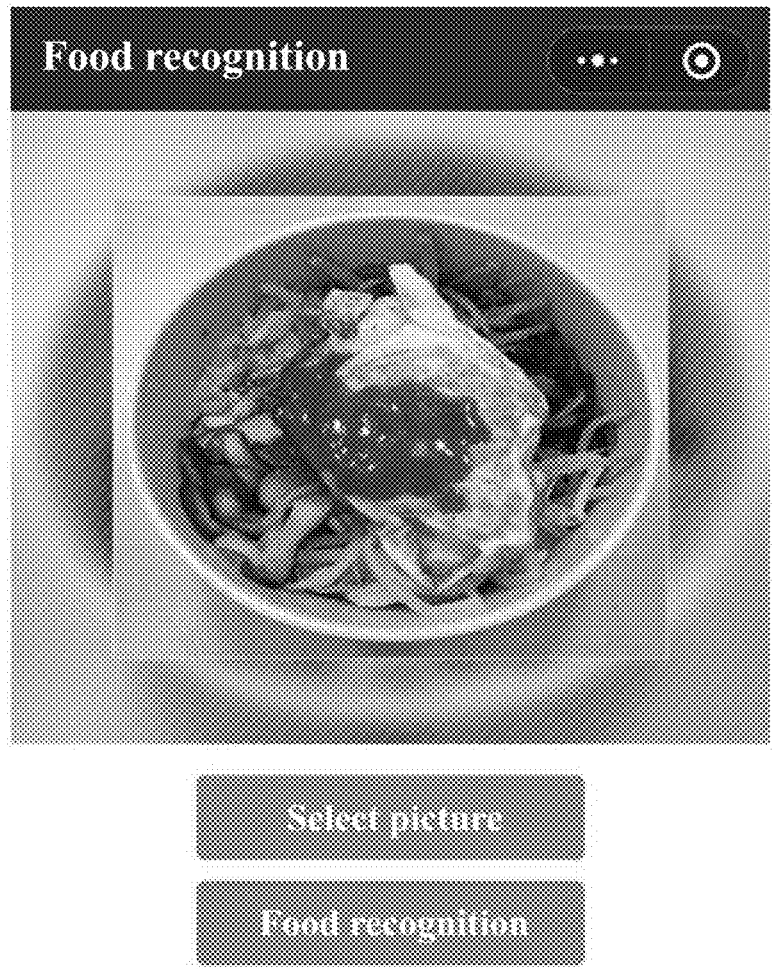
FIG. 4A is the first exemplary interface diagram of an application of an object information processing method provided by at least one embodiment of the present disclosure.

For example, in one example, the food image is illustrated in FIG. 4A, and the object to be detected is one kind of food. It should be noted that the object to be detected is one kind of food, and the food may include one type of food material, such as "watermelon" and "sweet potato" etc., and the food can also include a variety type of food materials, such as "bibimbap" and "tomato omelette" etc., which is not specifically limited by the embodiments of the present disclosure.

In step S102: the image is input into a joint model to obtain a plurality of labels for the object to be detected.

For example, the food recognition module illustrated in FIG. 3 includes execution codes of the joint model described in the above embodiments, in which, the food image is input into the joint model to obtain a plurality of labels for the object to be detected in the food image. For example, in one example, the plurality of labels output by the joint model are category labels and size labels. For example, the joint model is the convolutional neural network 20 illustrated in FIG. 2, the first output network 210 is used to output the category labels for the food, and the second output network 220 is used to output the size labels for food. The task of the first output network 21 is to classify the categories of food. For example, the category labels may include "watermelon", "mango", "bibimbap", "tomato omelette" and others. In some examples, there are more than 200 types of the category labels. The task of the second output network 220 is to classify the size of food. For example, the size labels may include "large", "medium", "small" and others. In practice, specific values respectively corresponding to the "large", "medium" and "small" labels can be set according to experience. For example, in one example, the size label "small" corresponds to a food weight below 200 g, the size label "medium" corresponds to a food weight within the range of 200-500 g, and the size label "large" corresponds to a food weight above 500 g, which may be set manually. It should be noted that the embodiments of the present disclosure do not specifically limit the setting of labels, which can be set according to experience or actual requirements.

For example, the types of the category labels output by the first output network 210 are obviously more than that of the size labels output by the second output network 220, thus the specific structure of the convolutional neural network 20 as described in the above embodiments can be used. For example, referring to FIG. 2, the size of the convolution kernel of the convolution layer in each operation layer in the underlying processing network 200 is 5×5, the size of the filter of the pooling layer is 2×2, and the activation function is ReLU. The size of the convolution kernel of the convolution layer in each operation layer in the first output network 210 is 3×3, the size of the filter of the pooling layer is 2×2, and the activation function is ReLU. The size of the convolution kernel of the convolution layer in each operation layer in the second output network 220 is 4×4, the size of the filter of the pooling layer is 2×2, and the activation function is ReLU. Details are not be repeated here.

For example, in one example, the virtual button "select picture" in the interface illustrated in FIG. 4A is clicked to select a picture, for example, selecting from an album or taking a picture with a camera. After the picture is selected, the virtual button "food recognition" is clicked, and then the food image illustrated in FIG. 4A is input into the joint model 20. The first output network 210 outputs the category label for the food to be detected, i.e., "bibimbap" and the second output network 220 outputs the size label for the food to be detected, i.e., "small".

In step S103: the object information of the object to be detected is obtained based on the plurality of labels.

For example, in one example, the step S103 may include acquiring data in an object database based on the plurality of labels to obtain the object information of the object to be detected. For example, the object database may be stored locally or in a server in advance, or the object database may be established by a server or acquired through the Internet when the object information processing method 10 is implemented, or may be read from other devices, which is not limited by the embodiments of the present disclosure, and may be set according to actual needs. For example, in one embodiment, acquiring the data in the object database based on the plurality of labels to obtain the object information of the object to be detected may include acquiring the data of the object to be detected from the object database using a similarity matching method based on the plurality of labels so as to obtain the object information of the object to be detected.

For example, in the case where the object information processing method 10 is applied to the automatic query system for food calorie and nutritional ingredients, the object database can be set as a food knowledge base. The food knowledge base includes names, nutritional ingredients, unit calorie of various foods and other data. Similarly, the food knowledge base may be stored locally or in a server in advance, or established by a server or acquired through the Internet when the object information processing method 10 is implemented, or read from other devices, which is not specifically limited by the embodiments of the present disclosure.

For example, as illustrated in FIG. 3, the question and answer module based on the food knowledge base can perform the following operations: obtaining data in the food knowledge base based on the plurality of labels for the food to be detected, so as to obtain the food information of the food to be detected.

For example, the two labels for the food image obtained by the above-mentioned joint model 20 are the category label "bibimbap" and the size label "small". The information related to the label "bibimbap" in the food knowledge base is obtained by querying in the food knowledge base based on the category label "bibimbap". For example, in the food knowledge base, the food information related to the label "bibimbap" may include the food name "Hotpot Mixed Rice", the nutritional ingredients and unit calorie corresponding to "Hotpot Mixed Rice" and other information. For example, the calorie (e.g., the total calories) of the food to be detected can be calculated according to the size label "small" of the food to be detected obtained through the above-mentioned joint model 20 and the unit calorie of the food to be detected obtained by querying the food knowledge base. For example, in one example, the unit calorie of "Hotpot Mixed Rice" obtained by querying the food knowledge base are about 115 kcal/100 g, and the size label output by the joint model 20 is "small". According to the food knowledge base, the weight of "Hotpot Mixed Rice" with the size "small" is about 150 g, and then the total calories of the food "Hotpot Mixed Rice" to be detected in the food image can be calculated as 1.15×155=173 kcal.

For example, in another example, the unit calorie of "sweet potato" in the food knowledge base are about 86 kcal/100 g, and the size label output by the joint model 20 is "medium". According to the food knowledge base, the weight of "sweet potato" with the size "medium" is about 250 g, and then the total calories of "sweet potato" in the image can be calculated as 0.86×250=215 kcal. For example, according to the user's request or querying, the nutritional ingredients of "sweet potato" in the food knowledge base can be output, or the nutritional ingredients can be output directly without the user's request or querying.

It should be noted that in some embodiments, the category label of food output by the above-mentioned joint model 20 may not match the food name in the food knowledge base. For example, in one example, the category label is "sweet potato", while the food type (e.g., the food name) in the food knowledge base is "Chinese potato". Similarly, the category label is "bibimbap", while the food type in the food knowledge base is "Hotpot Mixed Rice". To solve such problems, a similarity matching method can be used, such as cosine similarity, Jaccard similarity, Levenshtein similarity, word movement distance (WMD) similarity, etc. The embodiments of the present disclosure do not limit the selection of the similarity matching method.

For example, in one example, based on a certain food image, the food category label output by the joint model 20 is "sweet potato", and the similarities between the category label of food and the food names in the food knowledge base (for example, "sweet potato" and "taro") are calculated, and then the food name with the greatest similarity is selected as the matching result. For example, in one example, the similarity calculation method is illustrated in equation (1):

$$sim(l, n) = \frac{|S_{l,n}|}{\min(|S_l|, |S_n|)} \quad (1)$$

where l represents the output category label for the food (e.g., "sweet potato"), n is the food name in the food knowledge base (e.g., "Chinese potato"), $S_{l,n}$ represents a set of results returned by a search engine (e.g., Baidu, Google, etc.) with l and n as keywords, $S_l$ is a set of results returned by the search engines with l as the keyword, and similarly, $S_n$ is a set of results returned by the search engine with n as the keyword. |S| operation refers to calculating the number of elements in the corresponding set S. For example, the number of results returned by the search engine is 26,100,000 with "sweet potato" and "Chinese potato" as the keywords, the number of results returned by the search engine is 86,900,000 with "sweet potato" as the keyword, and the number of results returned by the search engine is 75,400,000 with "Chinese potato" as the keyword, then the similarity can be calculated as 261/754=0.35 taking the data into equation (1). Similarly, through the aforementioned method, the similarity of the recognition result "Hotpot Mixed Rice" in FIG. 4B can be calculated as 0.89.

For example, in at least one embodiment of the present disclosure, the object information processing method 10 further includes outputting the object information of the object to be detected. For example, as illustrated in FIG. 3, the food calorie and nutritional ingredients are output. For example, after obtaining the information related to the food to be detected in FIG. 4A (e.g., the name, calorie, nutritional ingredients of the food, etc.), the information is output for displaying to the user. As illustrated in FIG. 4B, the interface illustrates that the recognition result is "Hotpot Mixed Rice", the similarity is 89%, the calorie are 173 kcal, and the nutritional ingredients include carbohydrate, fat, protein, cellulose, etc.

In at least one embodiment of the present disclosure, the object information processing method 10 is applied to a scenario of food image recognition, such as the automatic query system for food calorie and nutritional ingredients. The category and size of the food to be detected are automatically identified through the joint model 20 described in the above embodiments. Based on the identified category of the food, the food knowledge base is queried, so that the unit calorie and nutritional ingredients of the food to be detected are obtained. The total calories of the food are calculated based on the unit calorie and size of the food, and the total calories and nutritional ingredients are displayed to the user. Compared with conventional user text input methods, the object information processing method 10 is simpler, more convenient for the user, and can provide more valuable information for the user compared with conventional methods which can only output unit calorie.

It should be noted that in the embodiments of the present disclosure, the output networks included in the joint model 20 are not limited to two, but can also be three or four, etc. Accordingly, the labels output by the joint model 20 are not limited to two (for example, not limited to the category label and size label), which can be determined according to the requirements of practical application scenarios. In the case where the object to be tested needs to be classified by a plurality of labels, a plurality of output networks are correspondingly provided, so that each output network can output a corresponding label At least one embodiment of the present disclosure also provides a method for training the joint model, and FIG. 5 is a flow chart of the method for training the joint model provided by at least one embodiment of the present disclosure. The joint model may include a convolutional neural network, the convolutional neural network includes a plurality of sub-networks, and the plurality of sub-networks includes an underlying processing network and at least two output networks. The underlying processing network includes a plurality of operation layers and is used to perform operation processing on the image of the object to be detected, in which the output of the underlying processing network serves as the input of each of at least two output networks. Each of the at least two output networks includes a plurality of operation layers and is used to receive the output of the underlying processing network and perform operation processing on the output of the underlying processing network to output a label of the object to be detected, and labels output by different output networks are different. For example, the joint model may be the convolutional neural network 20 illustrated in FIG. 2, which may be referred to the detailed description of FIG. 2 above, and will not be repeated here.

For example, in at least one embodiment of the present disclosure, as illustrated in FIG. 5, the method 50 for training the joint model may include the following operations:

In step S501: sample data is input into the joint model to obtain output data output from the joint model. The sample data includes a sample image and at least two preset labels corresponding to the object to be detected in the sample image, and the output data includes probability vectors corresponding to the preset labels respectively.

In step S502: a loss function is calculated based on the at least two preset labels and the probability vectors.

In step S503: a parameter of the joint model is modified based on the loss function.

It should be noted that, in the examples of the present disclosure, steps S501-S503 can be executed sequentially or in other adjusted orders, and some or all of the operations in steps S501-S503 can also be executed in parallel. The embodiments of the present disclosure do not limit the execution order of each step which can be adjusted according to actual conditions. For example, in the examples of the present disclosure, steps S501-S503 may be executed in a separate server (e.g., a cloud server, etc.) or may be executed on a local terminal, which is not limited by the embodiments of the present disclosure. For example, in some examples, in the implementation of the method 50 for training the joint model provided by at least one embodiment of the present disclosure, parts of the steps S501-S503 can be performed selectively, and some additional steps except steps S501-S503 can also be performed, which are not specifically limited by the embodiments of the present disclosure.

In step S501, for example, in one example, sample images included in the sample data may be a plurality of (for example, 6000) food images prepared in advance. For example, these food images can be prepared manually, crawled by a crawler software, or acquired by other means, which is not limited by the embodiments of the present disclosure. For example, the preset labels corresponding to the object to be detected in the sample images may be manually labeled on the food to be detected in the food images, for example, manually labeled the category and size of the food to be detected in each food image as the two preset labels, that is, a preset category label and a preset size label. For example, in one example, the size of the food to be detected is determined according to the experience of the annotator, so as to set the preset size label of the food to be detected, such as "large", "medium", "small" etc.

For example, after the sample data is input into the joint model, the output data output by the joint model includes the probability vectors corresponding to the preset labels respectively. For example, the joint model outputs a plurality of probability vectors, including a probability vector corresponding to the preset category label and a probability vector corresponding to the preset size label. For example, in one example, the preset category label has five types in total, which can be represented by a five-dimensional vector. Each dimension corresponds to one type, and the value of each dimension is 0 or 1. For example, in one example, the actual category of a certain food is the fourth type in the types of the preset category label, then the preset category label can be represented as (0, 0, 0, 1, 0), and the output data of the joint model 20 includes a probability vector corresponding to the preset category label, for example, (0.06, 0.1, 0.1, 0.7, 0.04), each dimension in the probability vector represents the probability value of the corresponding category. In this example, the probability value corresponding to the fourth category label is 0.7. For example, in one example, the actual size of a certain food is the second type in the types of the preset size label (for example, three types of "large", "medium", and "small"), then the preset size label can be represented as (0, 1,0), and the output data of the joint model 20 includes a probability vector corresponding to the preset size label, for example, (0.15, 0.6, 0.25), each dimension in the probability vector represents the probability value of the corresponding size. In this example, the second size label, that is, the label "medium" corresponds to the probability value of 0.6.

In step S502, the loss function is calculated based on at least two preset labels and probability vectors. For example, in one example, the loss function L can be preset as the following equation (2).

$$L = -\gamma \times \sum_{i=1}^{N} y_i \log l_i - (1-\gamma) \times \sum_{i=1}^{N} y'_i \log l'_i \qquad (2)$$

where $\gamma$ represents an adjustment parameter within the range of 0-1, used for adjusting the loss weight. N represents the number of sample images, for example 6000. $y_i$ represents the first preset label of the object to be detected in the $i^{th}$ sample image, and $l_i$ represents a probability corresponding to the first preset label $y_i$ in a probability vector output by the joint model for the object to be detected in the $i^{th}$ sample image, $y'_i$ represents the second preset label of the object to be detected in the $i^{th}$ sample image, and $l'_i$ represents a probability corresponding to the second preset label $y'_i$ in a probability vector output by the joint model for the object to be detected in the $i^{th}$ sample image.

For example, in one example, $y_i$ may represent a preset category label of food, i.e., the first preset label, and $y'_i$ may represent a preset size label of food, i.e., the second preset label. In the above examples, in the case where the actual category of a certain food is the fourth category in the preset category label, in the probability vector corresponding to the category label output by the joint model 20, the probability value corresponding to the fourth category is 0.7. Taking the data into equation (2), the loss function L is calculated. For example, in one example, parts of calculation of equation (2) may include: taking log for (0.06, 0.1, 0.1, 0.7, 0.04) which is the probability vector corresponding to the preset category label corresponding to the $i^{th}$ sample image, that is (log 0.06, . . . , log 0.04), then doing dot product with the preset category label (0, 0, 0, 1, 0), so as to get the value of "$y_i$ log $l_i$" in equation (2). The calculation of the preset size label and the corresponding probability vector is similar to the calculation of the preset category label and the corresponding probability vector, which is not repeated here. Details of the calculation process of the loss function L will not be described herein.

In step S503, the parameter in the joint model is modified according to the loss function. For example, in one example, the parameter is trained by methods such as back propagation, random gradient descent, and others, which may not be specifically limited in the present disclosure.

For example, in at least one embodiment of the present disclosure, at least two output networks included in the joint model share the output of the underlying processing network, thus, the joint model can jointly use the information of multiple different labels (e.g., information of the category label and information of the size label) to adjust parameters, which helps to reduce the amount of training data and improve the accuracy of the output results of the joint model.

For example, in one example, it is assumed that the preset size label corresponding to the preset category label "watermelon" of food in the sample data is "large" and the preset size label corresponding to the preset category label "mango" of food is "small" (generally, watermelon is bigger than mango). In the training process, in order to minimize the loss function L, the underlying processing network needs to maintain the preset label information for both "watermelon" and "mango", and similarly, to maintain the preset label information for both "mango" and "small". In this way, in the prediction process, the probability that the category label is determined as "watermelon" and the size label is determined as "small" is reduced, and similarly, the probability that the category label is determined as "mango" and the size label is determined as "large" is reduced. That is, the joint model uses the constraint relationships between different labels (for example, the category label and size label) to reduce the complexity of the model.

For example, in at least one embodiment of the present disclosure, different output networks in the joint model include different number of operational layers. For example, the different output networks are different from each other. For example, the joint model can be the convolutional neural network 20 illustrated in FIG. 2, which may be referred to the detailed description of FIG. 2 above, and will not be repeated here.

For example, in at least one embodiment of the present disclosure, the at least two output networks in the joint model include the first output network and the second output network. The number of operation layers in the first output network is larger than the number of operation layers in the second output network, and the size of the convolution kernel of the convolutional layer in each operation layer in the first output network is smaller than the size of the convolution kernel of the convolutional layer in each operation layer in the second output network. For example, the joint model can be the convolutional neural network 20 illustrated in FIG. 2, which may be referred to the detailed description of FIG. 2 above, and will not be repeated here.

In the embodiments of the present disclosure, the joint model trained by the method 50 for training the joint model can output a plurality of different labels of the object to be detected based on the same image, and the complexity is reduced with the constraint relationships between different labels, thereby the accuracy of the output results is improved, and the demand for training data is also reduced.

At least one embodiment of the present disclosure also provides an object information processing apparatus. FIG. 6 is a schematic block diagram of an object information processing apparatus provided by at least one embodiment of the present disclosure. As illustrated in FIG. 6, the object information processing apparatus 60 may include an image acquiring unit 601, a prediction unit 602, and a processing unit 603. These units or modules can be implemented by software, hardware, firmware or any combination thereof, for example, they can be respectively implemented as an image acquiring circuit 601, a prediction circuit 602, and a processing circuit 603.

For example, in at least one embodiment of the present disclosure, the image acquiring unit 601 is configured to acquire an image of an object to be detected. The prediction unit 602 is configured to input the image into a joint model to obtain a plurality of labels of the object to be detected. The processing unit 603 is configured to obtain object information of the object to be detected based on the plurality of labels. For example, the joint model includes a convolutional neural network, the convolutional neural network includes a plurality of sub-networks, and the plurality of sub-networks include an underlying processing network and at least two output networks. The underlying processing network includes a plurality of operation layers and is used to perform operation processing on the image, and the output of the underlying processing network serves as the input of each of the at least two output networks. Each of the at least two output networks includes a plurality of operation layers and is used to receive the output of the underlying processing network and perform operation processing on the output of the underlying processing network to output the labels. Labels output by different output networks are different.

For example, the specific operations performed by the image acquiring unit 601, the prediction unit 602, and the processing unit 603 can be referred to the relevant description of the object information processing method 10 provided by at least one embodiment of the present disclosure, and may not be repeated here.

For example, in one example, the processing unit 603 may further include a processing sub-unit 613. The processing sub-unit 613 is configured to acquire data in an object database based on the plurality of labels to obtain the object information of the object to be detected. For example, the specific operations performed by the processing sub-unit 613 can be referred to the relevant description of the object information processing method 10 provided by at least one embodiment of the present disclosure above, and may not be repeated here. The processing sub-unit 613 can be realized by software, hardware, firmware or any combination thereof, for example, the processing sub-unit 613 can be implemented as a processing sub-circuit 613.

For example, in at least one embodiment of the present disclosure, the plurality of labels include the category label, the size label, etc., and the embodiments of the present disclosure are not limited to this.

It should be noted that the image acquiring unit 601, the prediction unit 602, the processing unit 603, and the processing sub-unit 613 in the embodiments of the present disclosure can be implemented by hardware such as a processor, a controller, and software capable of implementing the related functions, or the combination of the hardware and software, and the embodiments of the present disclosure do not limit the specific implementations.

It should also be noted that in the embodiments of the present disclosure, the object information processing apparatus 60 may also include more units or modules, and is not limited to the above-mentioned image acquiring unit 601, prediction unit 602, processing unit 603, and processing sub-unit 613, which can be set according to actual needs, and is not limited in the embodiments of the present disclosure.

It should be understood that the object information processing apparatus 60 provided by the embodiments of the present disclosure can implement the described object information processing method 10, and can also achieve similar technical effects as the described object information processing method 10, which may not be described in detail here.

Figure 7:
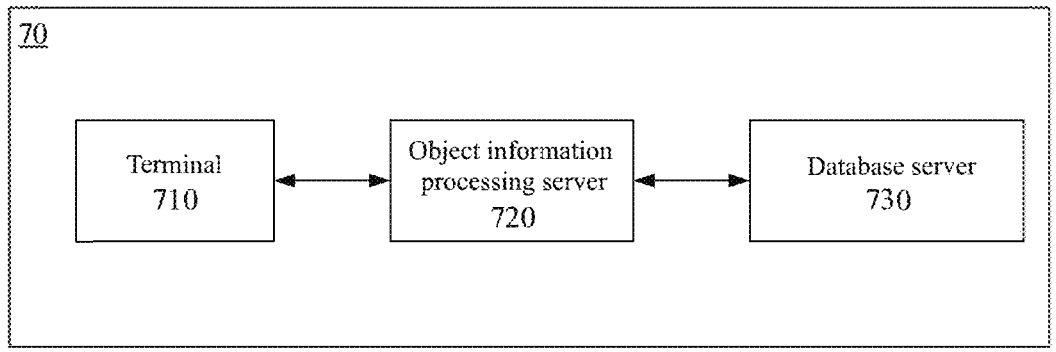
FIG. 7 is a schematic block diagram of an object information processing system provided by at least one embodiment of the present disclosure.

At least one embodiment of the present disclosure also provides an object information processing system. FIG. 7 is a schematic block diagram of an object information processing system provided by at least one embodiment of the present disclosure. As illustrated in FIG. 7, the object information processing system 70 includes a terminal 710 and an object information processing server 720, and the terminal 710 and the object information processing server 720 are in signal connection. For example, the terminal 710 is configured to transmit request data and an image of the object to be detected to the object information processing server 720. For example, in one example, the terminal 710 may be a mobile phone, a tablet computer, etc. of the user. For example, the request data refers to the data requesting the object information processing server 720 to perform the object information processing method provided by at least one embodiment of the present disclosure, and for example, the data may be a request instruction, a response instruction, and the like. For example, the image of the object to be detected may be a photo taken by the terminal 710, a photo stored in the terminal 710, a photo downloaded to the terminal 710 from the network, which may not be limited in the embodiments of the present disclosure. The object information processing server 720 is configured to acquire the image in response to the request data; input the image into the joint model to obtain a plurality of labels of the object to be detected; obtain object information of the object to be detected based on the plurality of labels; and transmit the object information to the terminal 710. The terminal 710 is also configured to display the object information. For example, the joint model includes a convolutional neural network, and the convolutional neural network includes a plurality of sub-networks, and the plurality of sub-networks include an underlying processing network and at least two output networks. The underlying processing network includes a plurality of operation layers and is used to perform operation processing on the image, where the output of the underlying processing network serves as the input of each of at least two output networks. Each of the at least two output networks includes a plurality of operation layers and is used to receive the output of the underlying processing network and perform operation processing on the output of the underlying processing network to output labels, in which, labels output by different output networks are different.

For example, above operations performed by the object information processing server 720 can be referred to the object information processing method 10 provided by at least one embodiment of the present disclosure, and may not be described in detail here.

For example, in one example, the terminal 710 included in the object information processing system 70 can be implemented as a client terminal (such as a mobile phone, a computer, etc.), and the object information processing server 720 can be implemented as a service terminal (such as a server).

For example, in one example, as illustrated in FIG. 7, the object information processing system 70 may also include a database server 730 in addition to the terminal 710 and the object information processing server 720, and database server 730 is configured to store an object database. The database server 730 is in signal connection to the object information processing server 720, and is configured to respond to the request information of the object information processing server 720 and return the data corresponding to the request information in the object database to the object information processing server 720. It should be noted that, in the case where the object information processing system 70 does not include the database server 730, the data of the object database can be directly stored on the object information processing server 720 or stored in other storage devices provided separately, or the object information processing server 720 can establish its own data knowledge base and then store it on the object information processing server 720 or on other storage devices provided separately, which is not particularly limited in the embodiments of the present disclosure.

An object information processing system 70 provided by at least one embodiment of the present disclosure can implement the object information processing method 10 provided by the previous embodiments, and can also achieve similar technical effects as the object information processing method 10 provided by the previous embodiments, which may not be described in detail here.

Figure 8:
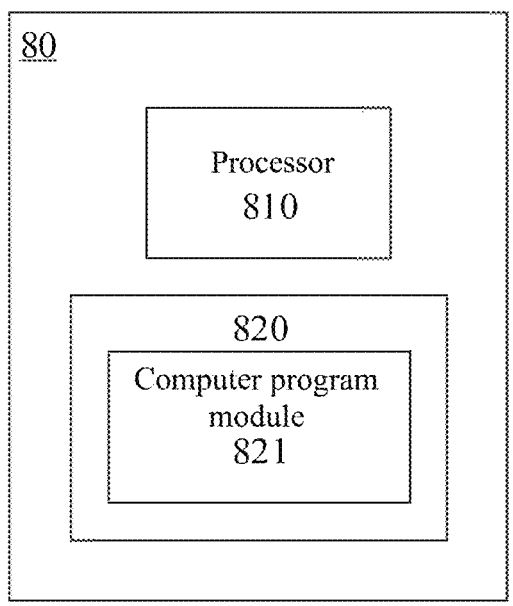
FIG. 8 is a schematic diagram of an electronic device provided by at least one embodiment of the present disclosure.

At least one embodiment of the present disclosure also provides an electronic device. FIG. 8 is a schematic diagram of an electronic device provided by at least one embodiment of the present disclosure. For example, as illustrated in FIG. 8, the electronic device 80 includes a processor 810 and a memory 820. The memory 820 includes one or more computer program modules 821. The one or more computer program modules 821 are stored in the memory 820 and configured to be executed by the processor 810. The one or more computer program modules 821 include instructions for executing any object information processing method provided by at least one embodiment of the present disclosure, and when executed by the processor 810, one or more steps of the object information processing method provided by at least one embodiment of the present disclosure can be executed. The memory 820 and the processor 810 may be interconnected by a bus system and/or other forms of connection mechanism (not shown).

For example, the memory 820 and the processor 810 may be provided at the service terminal (or the cloud), for example, provided in the above object information processing server 720, for executing one or more steps in the object information processing method described in FIG. 1. Of course, the memory 820 and the processor 810 may also be provided at the client terminal for executing one or more steps in the object information processing method described in FIG. 1.

For example, the processor 810 may be a central processing unit (CPU), a digital signal processor (DSP), or other processing units having data processing capability and/or program execution capability, such as a field programmable gate array (FPGA). For example, the central processing unit (CPU) can be X86 or ARM architecture. The processor 810 may be a general purpose processor or a special purpose processor, and may control other components in the electronic device 80 to perform the desired functions.

For example, the memory 820 may include any combination of one or more computer program products, which may include various forms of computer-readable storage media, such as a volatile memory and/or non-volatile memory. For example, the volatile memory may include a random access memory (RAM) and/or cache, etc. For example, the non-volatile memory may include a read-only memory (ROM), hard disk, erasable programmable read-only memory (EPROM), portable compact disk read-only memory (CD-ROM), USB memory, flash memory, etc. One or more computer program modules 821 may be stored on the computer-readable storage medium, and the processor 810 may execute the one or more computer program modules 821 to implement various functions of the electronic device 80. The computer-readable storage medium can also store various applications and various data as well as various data used and/or generated by the applications. Specific functions and technical effects of the electronic device 80 can be referred to the description of the object information processing method 10 above, which may not be described in detail here.

Figure 9:
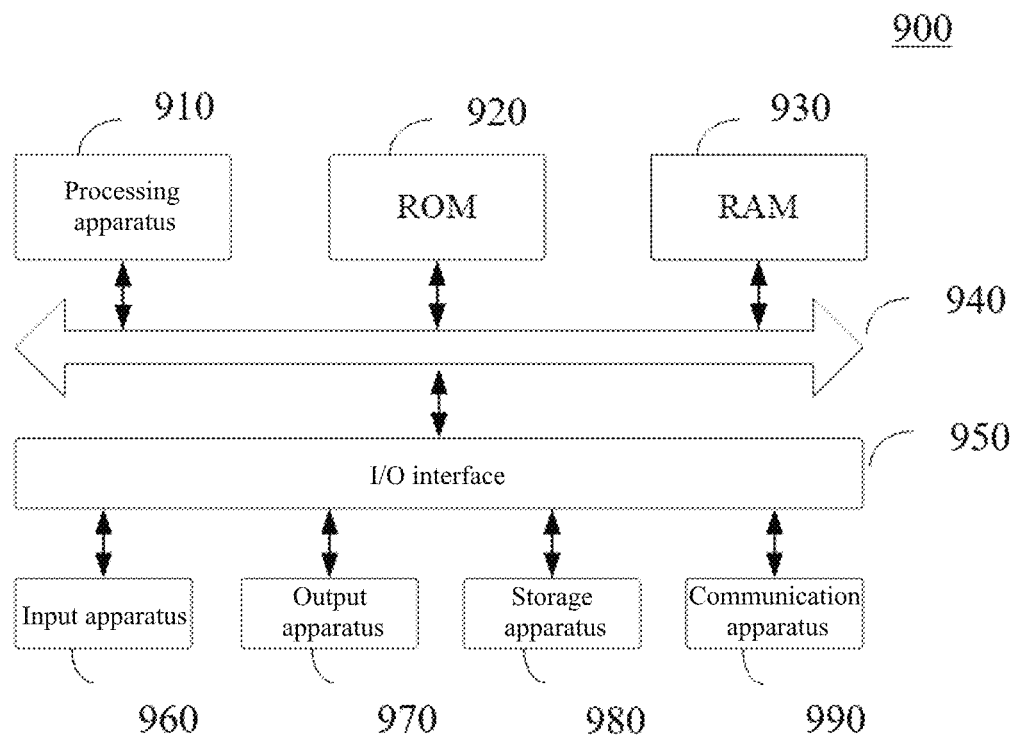
FIG. 9 is a schematic block diagram of a terminal provided by at least one embodiment of the present disclosure.

FIG. 9 is a schematic block diagram of a terminal provided by at least one embodiment of the present disclosure. For example, in at least one embodiment of the disclosure, the terminal is a computing terminal 900, which can be applied to perform the object information processing method provided by the embodiments of the present disclosure. For example, the computing terminal 900 can provide an image of the object to be detected and display the obtained object information. It should be noted that the terminal illustrated in FIG. 9 is only an example of the computing terminal 900, which would not bring any restrictions on the functions and application scopes of the embodiments of the present disclosure.

As illustrated in FIG. 9, the computing terminal 900 may include a processing apparatus (e.g., a central processing unit, a graphics processor, etc.) 910, which may perform various appropriate actions and processes according to the programs stored in a read only memory (ROM) 920 or the programs loaded from a storage apparatus 980 into a random access memory (RAM) 930. In the RAM 930, various programs and data required for the operations of the computing terminal 900 are also stored. The processing apparatus 910, ROM 920, and RAM 930 are connected to each other through a bus 940. An input/output (I/O) interface 950 is also connected to bus 940.

Generally, the following apparatuses can be connected to the I/O interface 950: an input apparatus 960 including, for example, a touch screen, a touchpad, a keyboard, a mouse, a camera, a microphone, an accelerometer, a gyroscope, and the like; an output apparatus 970 including such as a liquid crystal display (LCD), a speaker, a vibrator, and the like; a storage apparatus 980 including such as a magnetic tape, a hard disk, and the like; and a communication apparatus 990. The communication apparatus 990 may allow the computing terminal 900 to perform wireless or wired communication with other electronic devices to exchange data. Although FIG. 9 illustrates a computing terminal 900 having various devices, it should be understood that it is not required to implement or include all the illustrated devices, and the computing terminal 900 may alternatively implement or include more or fewer devices.

Figure 10:
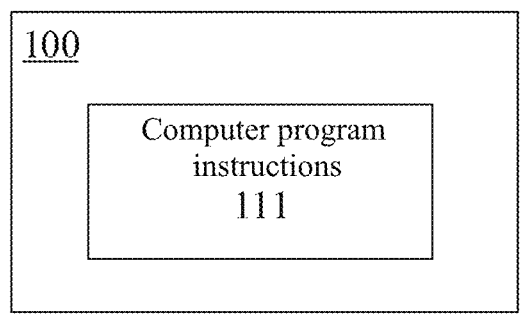
FIG. 10 is a schematic block diagram of a non-transitory readable storage medium provided by at least one embodiment of the present disclosure.

At least one embodiment of the present disclosure also provides a non-transitory readable storage medium. FIG. 10 is a schematic block diagram of a non-transitory readable storage medium 100 provided by at least one embodiment of the present disclosure. For example, as illustrated in FIG. 10, the non-transitory readable storage medium 100 includes computer program instructions 111 stored thereon. When the computer program instructions 111 are executed by the processor, one or more steps of the object information processing method 10 provided by at least one embodiment of the present disclosure are executed.

For example, the storage medium can be any combination of one or more computer-readable storage media, for example, one computer-readable storage medium includes computer-readable program code for acquiring the image of the object to be detected, another computer-readable storage medium includes computer-readable program code for inputting the image into the joint model to obtain a plurality of labels of the object to be detected, and another computer-readable storage medium includes computer-readable program code for obtaining the object information of the object to be detected based on the plurality of labels. Of course, the above program code can also be stored in the same computer readable medium, which is not limited by the embodiments of the present disclosure. For example, when the program code is read by a computer, the computer can execute the program code stored in the computer storage medium to execute the object information processing method 10 provided by any embodiment of the present disclosure.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disk read-only memory (CD-ROM), a flash memory, or any combination of the above storage media, and may also be other applicable storage media. For example, the readable storage medium can also be the memory 820 in FIG. 8, the related description may be referred to the aforementioned contents, which may not be repeated here.

It should be noted that the storage medium 100 can be applied to the object information processing server 720 or be applied to a terminal device, which can be determined by the technicians according to specific scenarios and is not limited here.

Figure 11:
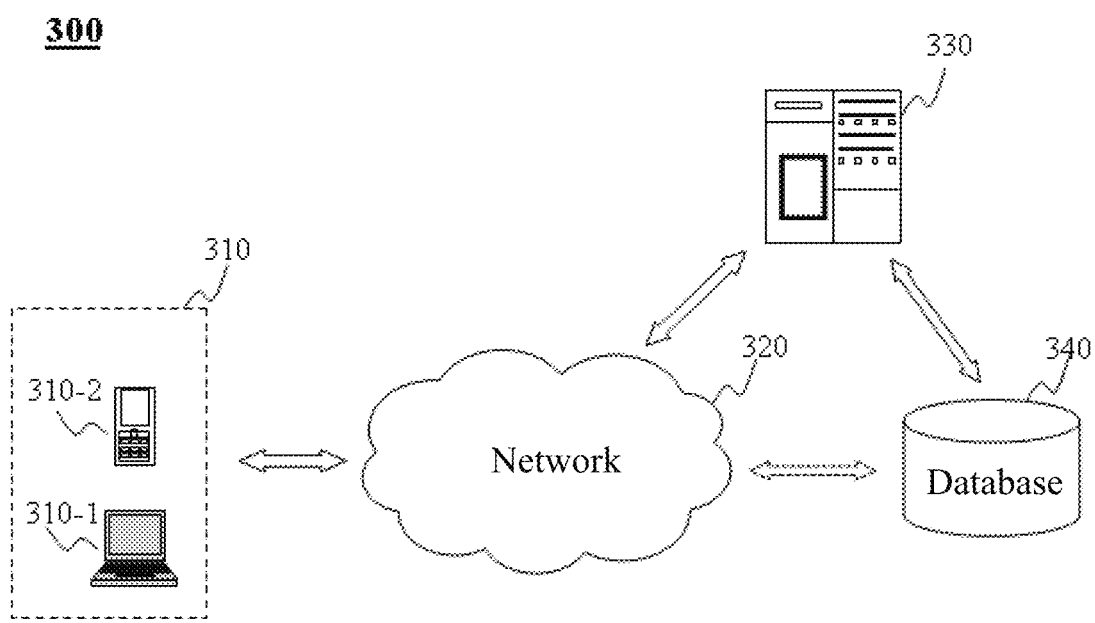
FIG. 11 illustrates an exemplary scenario of an object information processing system provided by at least one embodiment of the present disclosure.

FIG. 11 illustrates an exemplary scenario diagram of an object information processing system provided by at least one embodiment of the present disclosure. As illustrated in FIG. 11, the object information processing system 300 may include a user terminal 310, a network 320, a server 330, and a database 340.

For example, the user terminal 310 may be a computer 310-1 or a portable terminal 310-2 illustrated in FIG. 11. It can be understood that the user terminal can also be any other type of electronic device capable of receiving, processing, and displaying data, which can include but not limited to desktop computers, notebook computers, tablet computers, smart home devices, wearable devices, vehicle-mounted electronic devices, medical electronic devices, etc.

For example, the network 320 may be a single network or a combination of at least two different networks. For example, the network 320 may include, but is not limited to one or any combination of local area networks, wide area networks, public networks, private networks, the Internet, and mobile communication networks, etc.

For example, the server 330 may be a single server or a server group, and the servers in the server group are connected through a wired network or a wireless network. The wired network can communicate through twisted pair, coaxial cable, or optical fiber transmission, and the wireless network can communicate through 3G/4G/5G mobile communication network, Bluetooth, Zigbee, or WiFi. The present disclosure does not limit the types and functions of the networks here. The server group may be centralized, such as a data center, or may be distributed. Servers may be local or remote. For example, the server 330 may be a general-purpose server or a special-purpose server, and may be a virtual server or a cloud server.

For example, the database 340 can be used to store various data utilized, generated, and output in the operation of the user terminal 310 and the server 330. The database 340 can be interconnected or communicated with the server 330 or a part of the server 330 via the network 320, or directly interconnected or communicated with the server 330, or interconnected or communicated with the server 330 via a combination of the above two ways. In some embodiments, the database 340 may be a separate device. In other embodiments, the database 340 may also be integrated in at least one of the user terminal 310 and the server 340. For example, the database 340 can be provided on the user terminal 310 or provided on the server 340. For another example, the database 340 may also be distributed, one part of which is provided on the user terminal 310 and the other part is provided on the server 340.

For example, in one example, first, the user terminal 310 (e.g., the mobile phone of the user) can transmit request data and an image of the object to be detected to the server 330 via the network 320 or other technologies (e.g., Bluetooth communication, infrared communication, etc.). Next, the server 330 acquires the image in response to the request data. Next, the server 330 inputs the image into the joint model to obtain a plurality of labels of the object to be detected. Then, the server 330 obtains the object information of the object to be detected based on the plurality of labels. Then, the server 330 transmits the object information of the object to be detected to the user terminal 310 via the network 320 or other technologies (for example, Bluetooth communication, infrared communication, etc.). At last, the user terminal 310 displays the object information of the object to be detected after receiving it from the server 330.

In the present disclosure, the term "a plurality of" refers to two or more, unless otherwise explicitly defined.

Other embodiments of the present disclosure will readily occur to those skilled in the art after considering the specification and practicing the disclosure disclosed herein. The present disclosure is intended to cover any modification, application, or adaptation of the present disclosure, which follows the general principles of the present disclosure and includes common knowledge or conventional technical means in the technical field that may not disclosed in the present disclosure. The specification and embodiments are only regarded as exemplary, and the scope and spirit of the present disclosure are indicated by the following claims.

It should be understood that the present disclosure is not limited to the precise structure described above and illustrated in the drawings, and various modifications and changes can be made without departing from its scope. The scope of the present disclosure is only limited by the appended claims.

What is claimed is:

1. An object information processing method, comprising:
   acquiring an image of an object to be detected;
   inputting the image into a joint model to obtain a plurality of labels for the object to be detected; and
   obtaining object information of the object to be detected based on the plurality of labels,
   wherein the joint model comprises a convolutional neural network, the convolutional neural network comprises a plurality of sub-networks, and the plurality of sub-networks comprise an underlying processing network and at least two output networks,
   the underlying processing network comprises a plurality of operation layers and is used to perform operation processing on the image, and an output of the underlying processing network serves as an input of each of the at least two output networks, and
   each of the at least two output networks comprises a plurality of operation layers and is used to receive the output of the underlying processing network and perform operation processing on the output of the underlying processing network to output a label, and labels output by different output networks are different,
   wherein the obtaining the object information of the object to be detected based on the plurality of labels comprises:
      acquiring data in an object database based on the plurality of labels to obtain the object information of the object to be detected, and
   wherein the acquiring the data in the object database based on the plurality of labels to obtain the object information of the object to be detected comprises:
      acquiring data of the object to be detected from the object database with a similarity matching method based on the plurality of labels, wherein the object to be detected comprises food, the plurality of labels comprise a category label and a size label, and the data of the object to be detected at least comprises a name and unit calorie of the object to be detected; and
      calculating a calorie of the object to be detected based on the size label and the unit calorie of the object to be detected, so as to obtain the object information of the object to be detected, wherein the object information of the object to be detected at least comprises the name and the calorie of the object to be detected.

2. The object information processing method according to claim 1, wherein the plurality of labels comprise a category label and a size label.

3. The object information processing method according to claim 1, wherein the object to be detected comprises food, and the object information of the object to be detected comprises at least one of a name, calorie, and nutritional ingredients of the object to be detected.

4. The object information processing method according to claim 1, wherein the different output networks comprise different numbers of operation layers.

5. The object information processing method according to claim 1, wherein the at least two output networks comprise a first output network and a second output network, and
a number of operation layers comprised in the first output network is greater than a number of operation layers comprised in the second output network, and a size of a convolution kernel of a convolutional layer of each operation layer of the first output network is smaller than a size of a convolution kernel of a convolutional layer of each operation layer of the second output network.

6. The object information processing method according to claim 1, wherein a size of a convolution kernel of a convolutional layer of each operation layer of the underlying processing network is 5×5, a size of a filter of a pooling layer of the each operation layer of the underlying processing network is 2×2, and an activation function of the each operation
layer of the underlying processing network is a rectified linear unit,
the at least two output networks comprise a first output network and a second output network,
a size of a convolution kernel of a convolutional layer of each operation layer of the first output network is 3×3, a size of a filter of a pooling layer of the each operation layer of the first output network is 2×2, and an activation function of the each operation layer of the first output network is a rectified linear unit, and
a size of a convolution kernel of a convolutional layer of each operation layer of the second output network is 4×4, a size of a filter of a pooling layer of the each operation layer of the second output network is 2×2, and an activation function of the each operation layer of the second output network is a rectified linear unit.

7. The object information processing method according to claim 1, further comprising:
outputting the object information of the object to be detected.

8. A method for training a joint model, wherein the joint model comprises a convolutional neural network, the convolutional neural network comprises a plurality of sub-networks, and the plurality of sub-networks comprise an underlying processing network and at least two output networks,
the underlying processing network comprises a plurality of operation layers and is used to perform operation processing on an image of an object to be detected, and an output of the underlying processing network serves as an input of each of the at least two output networks, and
the each of the at least two output networks comprises a plurality of operation layers and is used to receive the output of the underlying processing network and perform operation processing on the output of the underlying processing network to output a label for the object to be detected, and labels output by different output networks are different,
the method for training the joint model comprises:
inputting sample data into the joint model to obtain output data output from the joint model, wherein the sample data comprises a sample image and at least two preset labels corresponding to an object to be detected in the sample image, and the output data comprises probability vectors corresponding to the at least two preset labels respectively;
calculating a loss function based on the at least two preset labels and the probability vectors; and
modifying parameters of the joint model based on the loss function, wherein the loss function L is:

$$L = -\gamma \times \sum_{i=1}^{N} y_i \log l_i - (1-\gamma) \times \sum_{i=1}^{N} y'_i \log l'_i,$$

where $\gamma$ represents an adjustment parameter, N represents a number of sample images, $y_i$ represents a first preset label for an object to be detected in an $i^{th}$ sample image, and $l_i$ represents a probability corresponding to the first preset label $y_i$ in a probability vector output by the joint model for the object to be detected in the $i_{th}$ sample image, $y'_i$ represents a second preset label for the object to be detected in the $i^{th}$ sample image, and $l'_i$ represents a probability corresponding to the second preset label $y'_i$ in a probability vector output by the joint model for the object to be detected in the $i^{th}$ sample image, and
wherein the at least two preset labels comprise a preset category label and a preset size label, the first preset label is the preset category label, and the second preset label is the preset size label.

9. The method according to claim 8, wherein labels for the object to be detected comprise a category label and a size label.

10. The method according to claim 8, wherein the object to be detected comprises food, and the sample image comprises a food image.

11. An object information processing apparatus, comprising an image acquiring unit, a prediction unit, and a processing unit, wherein the image acquiring unit, the prediction unit, and the processing unit of the object information processing apparatus are configured to implement the object information processing method according to claim 1.

12. The object information processing apparatus according to claim 11, wherein the processing unit further comprises a processing sub-unit, and the processing sub-unit is configured to:
acquire data in an object database based on the plurality of labels to obtain the object information of the object to be detected.

13. The object information processing apparatus according to claim 11, wherein the plurality of labels comprise a category label and a size label.

14. An object information processing system, comprising a terminal and an object information processing server,
wherein the terminal is configured to transmit request data and an image of an object to be detected to the object information processing server;
the object information processing server is configured to:
acquire the image of the object to be detected in response to the request data;
input the image into a joint model to obtain a plurality of labels of the object to be detected;
obtain object information of the object to be detected based on the plurality of labels; and
transmit the object information to the terminal, and
the terminal is further configured to display the object information;
wherein the joint model comprises a convolutional neural network, the convolutional neural network comprises a plurality of sub-networks, and the plurality of sub-networks comprise an underlying processing network and at least two output networks,
the underlying processing network comprises a plurality of operation layer and is used to perform operation processing on the image, and an output of the underlying processing network serves as an input of each of the at least two output networks, and each of the at least two output networks comprises a plurality of operation layers, the each of the at least two output networks is used to receive the output of the underlying processing network and perform operation processing on the output of the underlying processing network to output a label, and labels output by different output networks are different, wherein the object information processing server obtaining the object information of the object to be detected based on the plurality of labels comprises:

acquiring data in an object database based on the plurality of labels to obtain the object information of the object to be detected, and wherein the object information processing server acquiring the data in the object database based on the plurality of labels to obtain the object information of the object to be detected comprises:

acquiring data of the object to be detected from the object database with a similarity matching method based on the plurality of labels, wherein the object to be detected comprises food, the plurality of labels comprise a category label and a size label, and the data of the object to be detected at least comprises a name and unit calorie of the object to be detected; and calculating a calorie of the object to be detected base on the size label and the unit calorie of the object to be detected, so as to obtain the object information of the object to be detected, wherein the object information of the object to be detected at least comprises the name and the calorie of the object to be detected.

15. An electronic device, comprising:
a processor; and
a memory, comprising one or more computer program modules,
wherein the one or more computer program modules are stored in the memory and are configured to be executed by the processor, and the one or more computer program modules comprise instructions for implementing the object information processing method according to claim 1.

16. A non-transitory readable storage medium with computer instructions stored thereon, wherein the computer instructions, upon executed by a processor, implement the object information processing method according to claim 1.

* * * * *